Jan. 3, 1961 L. L. McCARTHY 2,966,804
MECHANICAL VIBRATOR FOR USE WITH FLUIDS AND SEMI-FLUIDS
Filed March 5, 1959 3 Sheets-Sheet 1
FIG_1
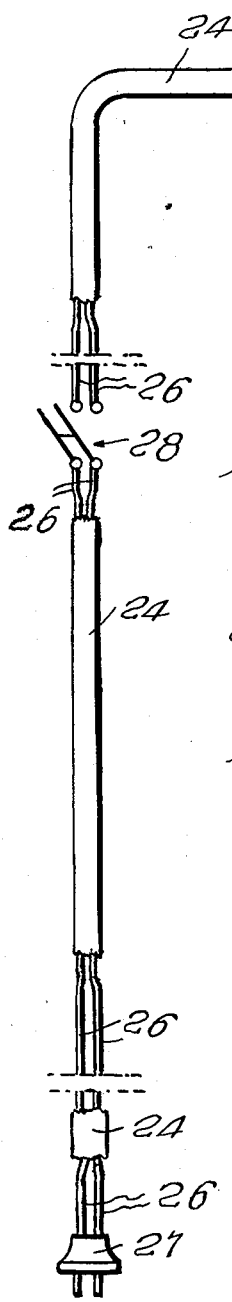
FIG_2
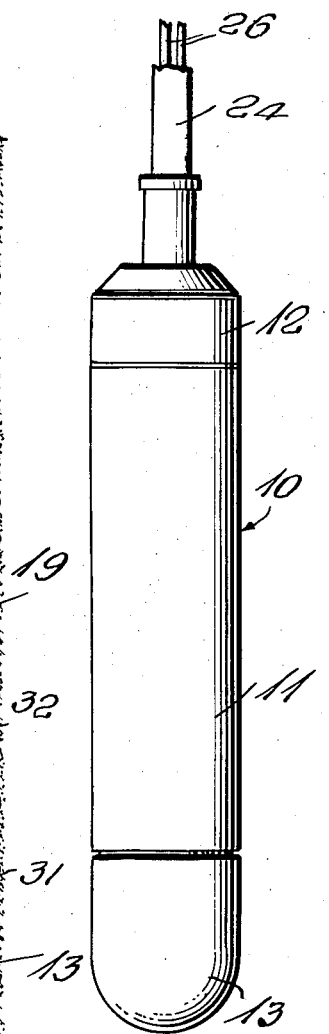
INVENTOR
LORIN L. McCARTHY,
BY *Felix A. Russell*
ATTORNEY

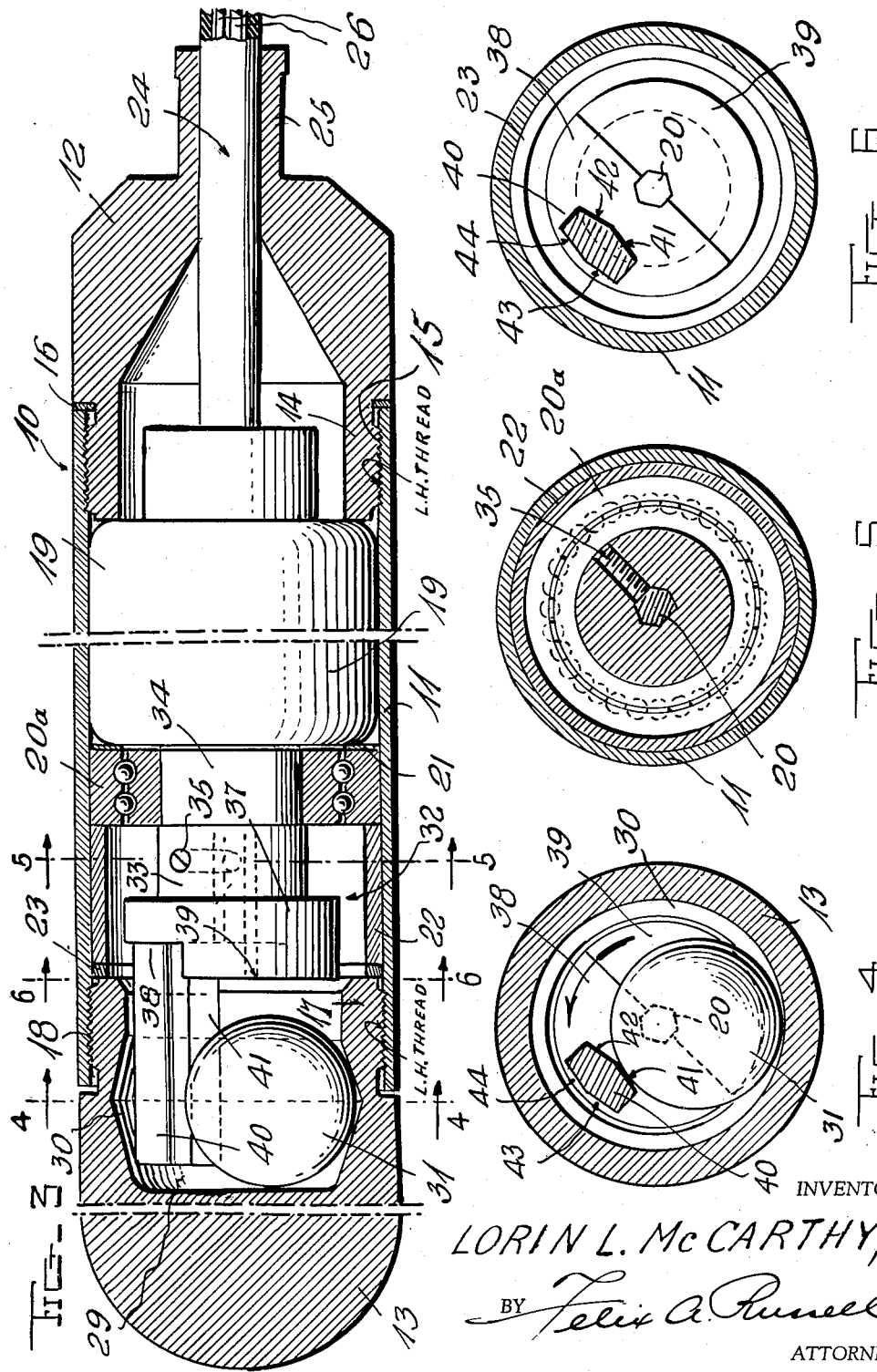

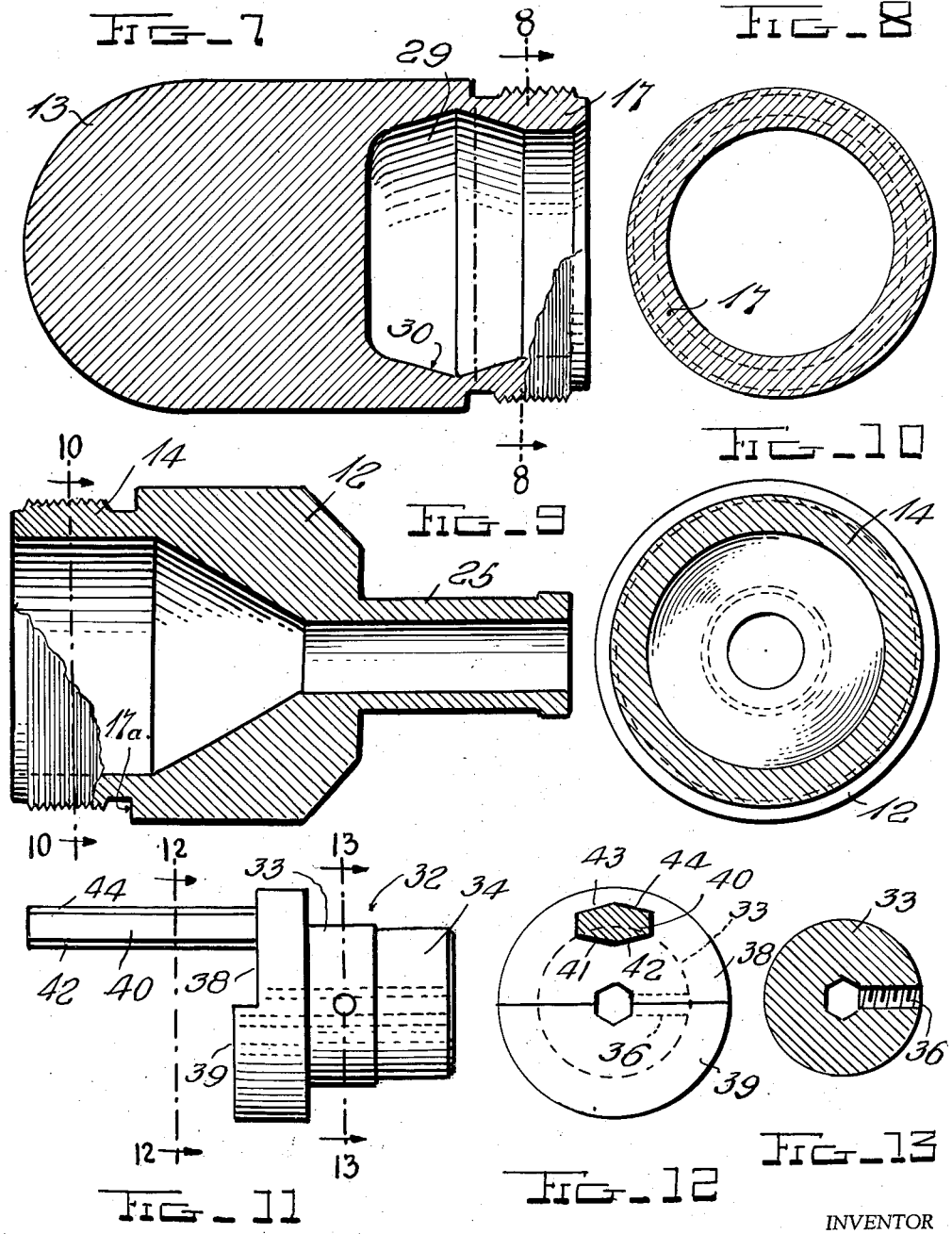

United States Patent Office 2,966,804
Patented Jan. 3, 1961

2,966,804

MECHANICAL VIBRATOR FOR USE WITH FLUIDS AND SEMI-FLUIDS

Lorin L. McCarthy, Canoga Park, Calif., assignor to Pacific Mercury Electronics Inc., Joplin, Mo., a corporation of California Filed Mar. 5, 1959, Ser. No. 797,468

1 Claim. (Cl. 74—87)

The present invention relates to a mechanical vibrator for use with dry or powder mixes or of fluids and semi-fluids and it consists in the combinations, constructions and arrangements of parts herein described and claimed.

Generally the invention relates to a device for the vibration of fluids and semi-fluids, particularly freshly poured concrete or "wet mix" and comprises a capsule-shaped housing or casing from which extends a cable. The cable is utilized in lowering the casing into or removing it from the mix and contains electrical leads for operating a motor located in the casing. The motor, in turn, normally operates a centrifugally weighted shaft mounted in two or more ring bearings. It is the centrifugally weighted shaft which imparts high-frequency vibrations to the casing and consequently to the mix and such vibrations act to expel air pockets from the mix while at the same time assist in more evenly distributing the ingredients of the mix.

In known devices of this type, a weighted rod having one of its ends mounted in a bearing and having its other end offset from the axis of such bearing in such manner that its free other end bears against a circular track to produce the necessary vibration in the casing.

In such known devices, the bearings are not only expensive in original installation but are subjected to excessive wear and must constantly be replaced thus removing the device from active use for periods of time while at the same time adding to the cost of operation, the cost of the replacement bearings together with the cost of labor involved.

The device of the present invention includes the cable, the capsule-shaped housing and the motor mounted in the housing. However, it provides an entirely novel means for producing the vibrations. Extending from the motor and rotatable thereby is a counterbalanced offset tang which is designed to travel in a circular path within the housing, pushing before it a steel ball which is confined within the housing. The size of the ball determines the amplitude-frequency ratio of the vibrations produced due to the fact that that portion of the weight of the ball which is off-center during its course of travel acts in identical manner with the off-center weight portions of the presently known devices above referred to. However, the path of forces produced in the device of the present invention is such as to eliminate the eccentric bearing load and, in operation, is capable of producing vibrations of higher frequency and lower amplitude, since such devices carry "runaway" motors and the presently invented device is subjected to a greatly lesser friction than the devices of the prior art.

It is accordingly an object of the invention to provide a novel mechanical vibrator for use in impacting vibrations dry or powder mixes or to fluids and semi-fluids.

Another object of the invention is to provide a device of the character set forth having novel vibration-producing means forming a part of the invention.

Still another object of the invention is to provide, in a device of the character set forth, a novel tang and ball, both forming parts of the invention.

A further object of the invention is to provide, in a device of the character set forth, novel counterbalancing means for a tang, said means and said tang both forming parts of the invention.

Other and further objects of the invention will become apparent from a reading of the following specification taken in conjunction with the drawings, in which:

Figure 1 is an elevational view, partly broken away and partly in section, illustrating an embodiment of the invention and showing the same in operative position in a concrete mix;

Figure 2 is an elevational view of the device illustrated in Figure 1;

Figure 3 is an enlarged sectional view, partly broken away, of the device as illustrated in Figure 2;

Figure 4 is a sectional view taken along line 4—4 of Figure 3;

Figure 5 is a sectional view, taken along line 5—5 of Figure 3;

Figure 6 is a sectional view taken along line 6—6 of Figure 3;

Figure 7 is a longitudinal sectional view of an end bell constituting a part of a casing and forming a part of the invention;

Figure 8 is a sectional view taken along line 8—8 of Figure 7;

Figure 9 is a longitudinal sectional view of an end cap constituting a part of the casing and forming a part of the invention;

Figure 10 is a sectional view taken along line 10—10 of Figure 9;

Figure 11 is an elevational view of a counterbalanced tapered tang forming a part of the invention;

Figure 12 is a sectional view taken along line 12—12 of Figure 11; and

Figure 13 is a sectional view taken along line 13—13 of Figure 11.

Referring more particularly to the drawings, there is shown therein a housing generally indicated at 10 and comprising a hollow vertically extending sleeve 11 to the upper end of which is connected a cap 12 and to the lower end of which is connected a relatively heavy lower end cap or bell 13.

The upper end cap 12 is provided with a reduced portion 14 at its lower end which is exteriorly threaded to engage with interior threads in the sleeve 11, as indicated at 15, such threads being left-hand threads. The reduced portion 14 provides with the main body of the cap 12 a shoulder between which and the adjacent upper end of the sleeve 11 a washer 16 is interposed, such shoulder being indicated at 17a in Figure 9.

The end bell 13 is provided at its upper end with a reduced portion 17 which is exteriorly threaded for engagement with interior threads on the lower end portion of the sleeve 11, as indicated at 18, such threads likewise being left-handed.

Mounted within the sleeve 11 with its upper end in abutting relation with the lower end of the cap 12 is an electric motor 19 having a downwardly extending shaft 20 which is preferably and as shown hexagonal shaped in cross sectional area.

A ring ball bearing 20a is mounted in the sleeve 11 immediately below the motor 19 and a shim 21 is interposed between the bearing 20a and the motor 19. A cylindrical spacer member is mounted in the sleeve 11 immediately below the bearing 20a and abuts at its upper end the bearing 20a and, at its lower end is in abutting relationship with a washer 23 which is interposed between it and the upper end of the reduced portion 17 of the end bell 13.

A relatively heavy cable 24 extends from the upper end of the motor 19 through a collar 25 integrally formed at the upper end of the cap 12 and contains electrical leads 26 which interconnect the motor 19 and a connector plug 27 to a source of electrical energy which may be a permanent source or a field generator or the like. The cable 24 is provided with a switch generally indicated at 28 at some point thereon conveniently near the housing 10. While the switch 28 is illustrated schematically, it is to be understood that it may be of any convenient form which will open and close an electrical circuit including the leads 26 without in any way lessening the strength of the cable 24.

A hollow chamber 29 is provided in the upper end portion of the end bell 13 and an annular trackway 30 is formed substantially centrally in the walls of the chamber 29. Preferably and as shown, the trackway 30 is V-shaped in cross sectional area. A relatively heavy ball 31 of steel or the like is positioned in the chamber 29 and is adapted to roll in the trackway 30.

A driver is generally indicated at 32 and is shown in elevational view particularly in Figure 11. The driver consists of a cylindrical body 33 having an upwardly extending reduced portion 34 which extends into the ball bearing member 20. The body 33 is fastened to the shaft 20 by means of a set screw 35 which is threaded into a radially extending opening 36 in the body 33 to abut against the shaft 20.

The underside of the body 33 has integrally formed therewith an enlarged cylindrical portion 37 which is diametrically divided into a relatively thin segment 38 and a relatively thick segment 39.

Centrally affixed to the outer or lower face of the peripheral portion of the relatively thin segment 38 is a tang 40 whose principal or longitudinal axis extends in a direction parallel to the longitudinal axis of the driver body 33 and its reduced and enlarged portions. The tang 40 is generally rectangular in cross sectional area but the longer sides of such area are beveled, as indicated at 41, 42, 43 and 44, particularly that portion 41 thereof which is adapted to contact the ball 31 as shown particularly in Figures 1, 3 and 4.

In operation, when it is desired to impart vibrations to, for example, a mass of concrete or the like as indicated at 45, the housing 10 is lowered into the mix 45 by means of the cable 24, the connector 27 previously having been connected to a source of electrical energy. The switch 28 is then closed causing the motor 19 to revolve its shaft 20 and consequently the driver 32. This will cause the tang 40 to move in a circular path driving the ball 31 likewise in a circular path in the trackway 30. It will be appreciated that during such rotation of the driver the relatively thick segment 39 will act as a counterbalance not only for the tang 40 but for that portion of the ball 31 which is moving off center. Such action will, of course, impart vibrations to the housing 10 and consequently to the mix 45 in well known manner, the size of the ball determining the amplitude frequency ratio of the vibrations produced. It will be apparent, however, that the path of forces produced by the present mechanism is such that it will eliminate any eccentric load upon the bearing 20. It will also be apparent that the forces opposing the operation of the motor 19 are almost entirely rolling friction and that the device is capable of producing higher frequency, lower amplitude vibrations than previous devices of this character due to its construction which permits such low friction index.

While but one form of the invention has been shown and described herein, it will be readily apparent to those skilled in the art that many minor modifications may be made without departing from the spirit of the invention or the scope of the appended claim.

What is claimed is:

A device of the character described comprising a vertically extending tubular sleeve, an upper end cap threadably connected to the upper end of said sleeve, a lower end cap threadably connected to the lower end of said sleeve and having a centrally disposed circular chamber in the upper end portion thereof and an annular trackway of shallow V-shaped cross section formed centrally in the walls thereof, an electric motor mounted in the upper end portion of said sleeve, a drive shaft extending downwardly from said motor in centrally disposed relation to said sleeve, a ball positioned in said chamber for free low friction two point contact movement in said trackway, a tang eccentrically mounted on the lower end of the shaft and extending into said chamber, said tang having a flat surface adapted for low friction point contact with said ball, counterbalancing means for said tang carried by said shaft, a cable extending from said motor through said upper end cap, and electrical leads for said motor encompassed in said cable, said counterbalancing means comprising a cylindrical body having a reduced diameter integral hub portion coaxial therewith and axially bored to receive the end of said shaft, a portion of said cylindrical body being unbalancingly cut away along an axial plane and along a plane at right angles to said first-mentioned plane, said tang being fixed eccentrically to said body and parallel to the axis thereof so as to restore the balance thereof.

References Cited in the file of this patent

UNITED STATES PATENTS

| | | |
|---|---|---|
| 1,459,841 | Mitchell | June 26, 1923 |
| 1,719,122 | Mitchell | July 2, 1929 |
| 2,422,639 | Wenander | June 17, 1947 |
| 2,705,618 | Wyzenbeek | Apr. 5, 1955 |
| 2,778,230 | Peterson | Jan. 22, 1957 |
| 2,829,529 | Fleming | Apr. 8, 1958 |
| 2,877,644 | Beil et al. | Mar. 17, 1959 |
| 2,808,238 | Splitler | Oct. 1, 1959 |

FOREIGN PATENTS

| | | |
|---|---|---|
| 64,467 | France | June 8, 1955 |
| | (first addition of 1,063,465) | |
| 552,372 | Belgium | Nov. 30, 1956 |
| 1,164,283 | France | May 12, 1958 |